United States Patent [19]
Mori

[11] Patent Number: 4,732,442
[45] Date of Patent: Mar. 22, 1988

[54] PHOTORADIATOR

[76] Inventor: Kei Mori, 3-16-3-501, Kaminoge, Setagaya-ku, Tokyo, Japan

[21] Appl. No.: 576,236

[22] Filed: Feb. 2, 1984

[51] Int. Cl.[4] .................... G02B 6/00; F21V 7/04
[52] U.S. Cl. .................. 350/96.10; 350/96.29; 350/96.30; 350/96.31; 362/32
[58] Field of Search .......... 350/96.10, 96.15, 96.29, 350/96.30, 96.32, 96.31, 258, 259, 260, 261, 262, 263, 264; 362/32, 26, 30; 128/395, 396, 397, 398

[56] References Cited

U.S. PATENT DOCUMENTS

| | | | |
|---|---|---|---|
| 2,056,990 | 10/1936 | Symonds | 128/398 |
| 2,387,816 | 10/1945 | Wagner | 362/32 |
| 2,591,269 | 4/1952 | Lehoczki | 362/32 |
| 3,299,306 | 1/1967 | Kapany | 350/96.15 |
| 3,299,306 | 1/1967 | Kapany | 350/96.10 |
| 4,411,490 | 10/1983 | Daniel | 350/96.10 |
| 4,422,719 | 12/1983 | Orcutt | 350/96.30 |
| 4,428,988 | 1/1984 | Adinamis | 362/32 |
| 4,459,642 | 7/1984 | Mori | 362/32 |
| 4,471,412 | 9/1984 | Mori | 362/32 |
| 4,585,298 | 4/1986 | Mori | 350/96.10 |
| 4,669,817 | 6/1987 | Mori | 350/96.15 |
| 4,678,279 | 7/1987 | Mori | 350/96.10 X |

FOREIGN PATENT DOCUMENTS

| | | | |
|---|---|---|---|
| 0069977 | 1/1983 | European Pat. Off. | 362/32 |
| 58-7604 | 1/1983 | Japan | 350/96.15 |

*Primary Examiner*—William L. Sikes
*Assistant Examiner*—Brian M. Healy
*Attorney, Agent, or Firm*—Jordan and Hamburg

[57] ABSTRACT

A photoradiator has a light conducting rod and a casing which surrounds the rod to define an annular space therebetween. Disposed in the annular space are transparent members which are engaged with both the light transparent members which are engaged with both the light conducting rod and the casing in order to effectively radiate light, which propagates through the light conducting rod. The transparent members comprise rods arranged parallel to the light conducting rod, rings coaxially surrounding the light conducting rod, a combination of such rods and rings, a pack of small pieces, or bars extending parallel to the light conducting rod and having a generally triangular cross-section. The transparent members are dimensioned and arranged to set up an even distribution of light throughout the length of the light conducting rod.

9 Claims, 16 Drawing Figures

PHOTORADIATOR

BACKGROUND OF THE INVENTION

The present invention relates to a photoradiator for diffusing light to the ambience which is introduced thereinto from a light conducting cable or the like. The photoradiator is usable, for example, as a light source for photosynthetic reactions.

To meet the increasing demand for energy saving today, effective use of solar energy has been studied in various fields actively. For the most effective use of solar energy, it is the primary requisite that the solar energy be used as optical energy without being transformed into another kind of energy such as thermal energy or electrical energy. In light of this, the applicant has proposed in various forms a lighting system in which the sunlight converged by lenses or the like is introduced into light conducting cables to propagate therethrough to desired locations.

Light advancing through a light conducting cable has directivity. Hence, concerning the application of the solar energy to lighting as stated above, the angular range available for the radiation of light is usually not larger than about 46 degrees when the light is discharged from a simply cut end of the light conducting cable. Such a narrow radiation range is incapable of lighting a room or the like in an even luminous intensity distribution. The applicant has made various propositions concerned with a photoradiator which effectively diffuses light introduced thereinto from a light conducting cable over substantial range and in an even luminous intensity distribution.

Meanwhile, fish farming or like industry requires zooplunkton in order to feed small fish or the like. Zooplunkton, in turn, propagates with chlorella employed as a feed. What is necessary for effective cultivation of chlorella is the adequate supply of optical energy and carbon dioxide, as well known in the art. A dillematic situation encountered with chlorella cultivation is that as chlorella propagates to a substantial density, it prevents light from reaching distant places with its own shadow and, thereby, fails to be evenly supplied with optical energy. The lighting systems and photoradiators proposed by the applicant are a solution to such a situation.

The present invention constitutes an improvement over the proposed photoradiators.

SUMMARY OF THE INVENTION

It is an object of the present invention to provide a simple photoradiator which allows light propagating through a light conducting cable to be effectively radiated by diffusion in an even intensity distribution.

It is another object of the present invention to provide a generally improved photoradiator.

A photoradiator for radiating light which is introduced into one end thereof to propagate therethrough toward the other end of the present invention comprises a cylindrical light conducting member defining the one end and the other end of the photoradiator, a casing disposed coaxially around the light conducting member to define an annular space in cooperation with the light conducting member, the casing being made of a light transmitting material, and a plurality of transparent members arranged in the annular space to engage with an outer periphery of the light conducting member and an inner periphery of the casing, whereby the light propagating through the photoradiator is discharged radially outwardly from the photoradiator through the transparent members and the casing.

In accordance with the present invention, a photoradiator has a light conducting rod and a casing which surrounds the rod to define an annular space therebetween. Disposed in the annular space are transparent members which are engaged with both the light conducting rod and the casing in order to effectively radiate light, which propagates through the light conducting rod. The transparent members comprise rods arranged parallel to the light conducting rod, rings coaxially surrounding the light conducting rod, a combination of such rods and rings, a pack of small pieces, or bars extending parallel to the light conducting rod and having a generally triangular cross-section. The transparent members are dimensioned and arranged to set up an even distribution of light throughout the length of the light conducting rod.

The above and other objects, features and advantages of the present invention will become more apparent from the following detailed description taken with the accompanying drawing.

DESCRIPTION OF THE PREFERRED EMBODIMENTS

While the photoradiator of the present invention is susceptible of numerous physical embodiments, depending upon the environment and requirements of use, substantial numbers of the herein shown and described embodiments have been made, tested and used, and all have performed in an eminently satisfactory manner.

To facilitate understanding of the present invention, some prior art photoradiators which the applicant has proposed will be described with reference to FIGS. 1-3.

Figure 1:
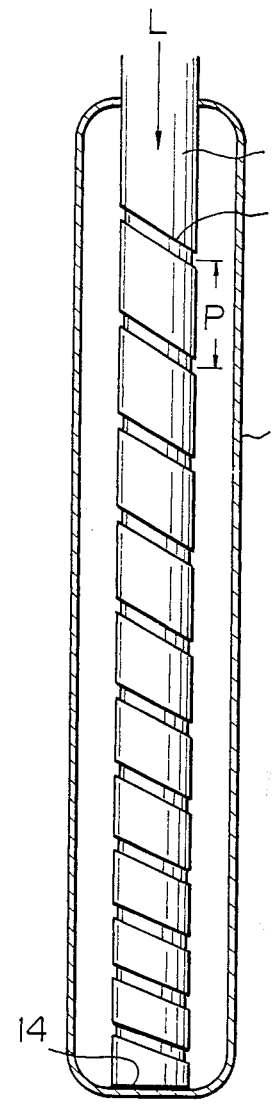
FIGS. 1-3 are views of prior art photoradiators which the applicant has proposed.

In FIG. 1, the photoradiator comprises a light conducting member 10 which has a spiral recess or groove 12 formed in the periphery thereof. Light L introduced into the light conducting member 10 propagates therethrough to be effectively radiated to the ambience reflected by the walls of the spiral groove 12. The radiated light may be used for lighting purpose by way of example.

The pitch P of the spiral groove 12 may be sequentially reduced along the direction of light propagation through the light conductor 10 in order to discharge the light substantially in an even intensity distribution over the entire length of the light conductor 10. A reflector 14 may be mounted on the light outlet end of the light conductor 10 so as to steer radially outwardly even the light returned by the reflector 14 into the light conductor 10.

A transparent or semitransparent casing or sheath 16 may be employed to hermetically encapsulate the light conductor 10. The sheath 16 will keep the light conductor 10 from contamination or damage while preventing one from being hurt by the sharp edges of the spiral groove 12. Especially, where the photoradiator is used under water as a light source for the cultivation of chlorella, for example, the sheath 16 will allow no fur to gather on the surface of the light conductor 10 thereby maintaining it clean all the time. Another advantage attainable with the sheath 16 is that the air layer between the light conductor 10 and the sheath 16 allows the light to be scattered into the water over a desired range and in a desired direction. Should the sheath 16 be absent, the light would be radiated in quite a limited range from the end portion of the light conductor 10.

Figure 2:
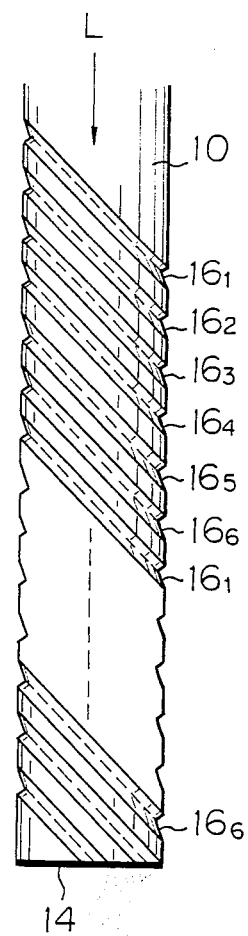
Figure 3:
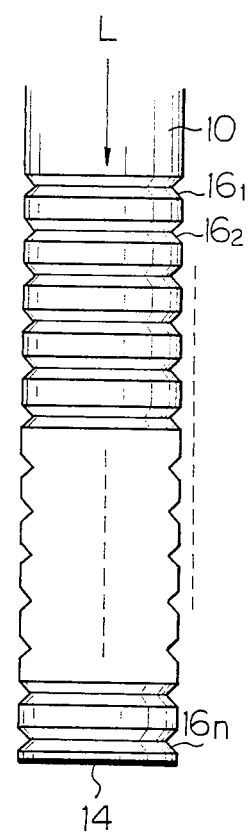

The photoradiators shown in FIGS. 2 and 3 are essentially similar in function to the photoradiator described above with reference to FIG. 1. In these drawings, structural elements common or similar to those of FIG. 1 are designated by the same reference numerals. In FIG. 2, the cylindrical light conductor 10 is formed with a plurality of spiral grooves in the peripheral surface thereof, grooves $16_1$-$16_6$ in the illustrated example. In FIG. 3, the cylindrical light conductor 10 is formed with a plurality of annular grooves $16_1$-$16_n$ at spaced locations along the length thereof. The sheath 16 shown in FIG. 1 may be employed with the photoradiator of FIG. 2 or 3, if desired. Again, the pitch of the spiral grooves $16_1$-$16_n$ or the depth of the annular grooves $16_1$-$16_n$ may be sequentially increased along the length of the light conductor 10 in order to set up an even distribution of light.

Figure 4A:
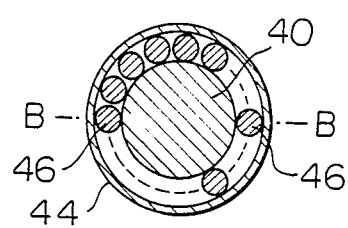
FIGS. 4A and 4B are views of a photoradiator embodying the present invention.
Figure 4B:
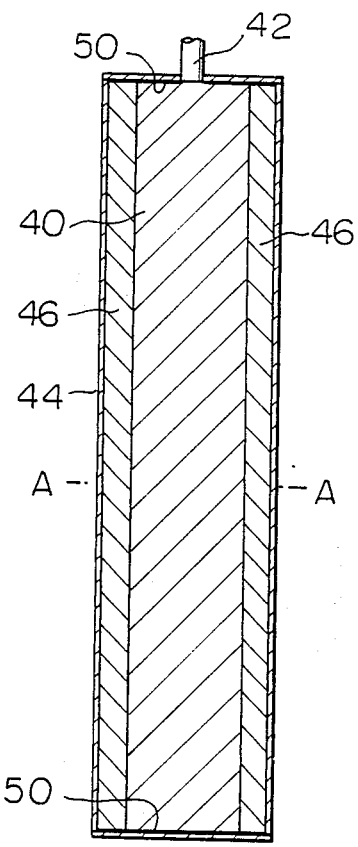

Referring to FIGS. 4A and 4B, a photoradiator embodying the present invention is shown and includes a cylindrical light conducting member 40. A light conducting cable 42 extending from a light source (not shown) is connected to one end of the light conductor 40. A transparent or semitransparent casing or sheath 44 coaxially and hermetically surrounds the light conductor 40 in such a manner as to define an annular spacing therebetween. Arranged in this annular space are a plurality of transparent elongate members, or rods, 46 which are parallel to the light conductor 40 and engaged with the outer periphery of light conductor 40 and the inner periphery of the sheath 44. Although not shown for the simplicity of illustration, the light conductor 40 is formed with a recess or recesses as described in conjunction with the prior art photoradiators.

In the construction shown in FIGS. 4A and 4B, light introduced from the cable 42 into the light conductor 40 emanates therefrom in the previously described manner and then directed to the outside through the transparent rods 46. It will be understood that the light appears in vertical lines which correspond in number to the transparent rods 46.

Figure 5A:
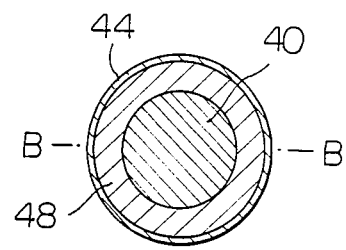
FIGS. 5A and 5B are views of another embodiment of the present invention corresponding to FIGS. 4A and 4B respectively.
Figure 5B:
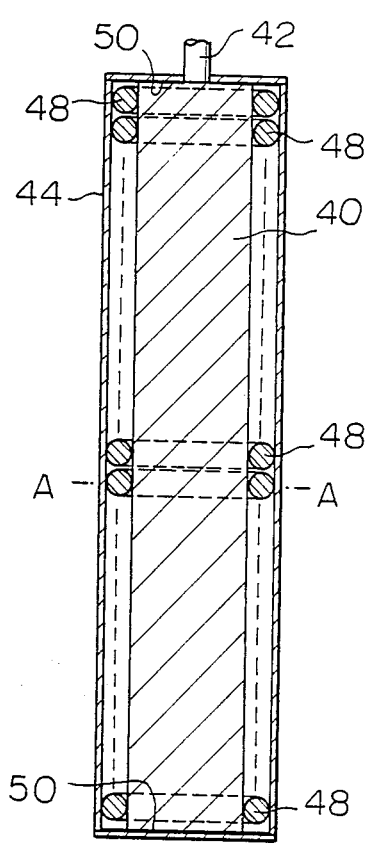

Referring to FIGS. 5A and 5B, another embodiment of the present invention is shown. In these drawings, the same structural elements as those shown in FIGS. 4A and 4B are designated by like reference numerals. As shown, the photoradiator comprises a plurality of annular transparent members, or rings, 48 which are stacked one upon another in the annular spacing between the light conductor 40 and the sheath 44. Each of the transparent rings 48 is engaged with the outer periphery of the light conductor 40 and the inner periphery of the sheath 44. In this construction, light will be emitted as horizontal lines which are identical in number with the transparent rings 48.

Figure 6A:
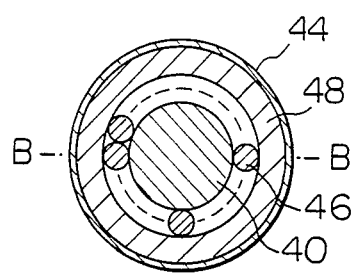
FIGS. 6A and 6B are views of another embodiment of the present invention also corresponding to FIGS. 4A and 4B respectively.
Figure 6B:
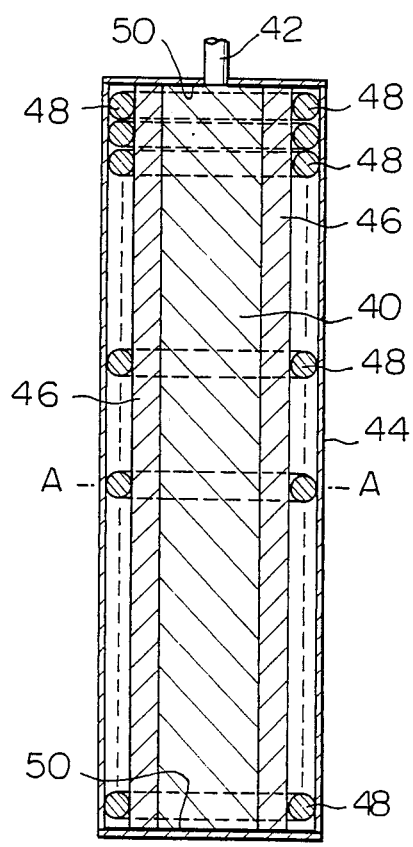

The photoradiator construction of FIGS. 4A and 4B and that of FIGS. 5A and 5B may be combined as illustrated in FIGS. 6A and 6B. In FIGS. 6A and 6B, structural elements common or similar to those of FIGS. 4A and 4B and 5A and 5B are designated by like reference numerals. The transparent rods 46 are arranged around and in contact with the light conductor 40, and the transparent rings 48 around the rods 46 in contact with the rods 46 and sheath 44. In this combined photoradiator configuration, light will emanate in the form of spots the number of which is equal to the number of the intersecting points of the rods 46 and rings 48.

The grooved configuration of the light conductor 40 shown and described is not essential in accordance with the present invention. Where use is made of a light conductor without a groove and the transparent rods and/or rings are arranged therearound, the spacing between adjacent rings may be sequentially decreased along the direction of light propagation to substantially evenly discharge the light from the respective rings.

In any of the foregoing embodiments, the refractive index may be sequentially increased from the light conductor 40 toward the sheath 44 so as to more effectively steer the light from the light conductor 40 to the outside of the sheath 44. For additionally effective conduction of the light to the outside of the sheath 44, the refractive indexes and diameters of the transparent rods 46 and rings 48 may be selected such that the light incident on the rods 46 or the rings 48 are focused to the inlet/outlets of the rods 46 or rings 48.

While the rods 46 and rings 48 have been shown and described as having circular cross-sections, such is only illustrative and they may be provided with triangular or arcuate cross-sections instead. The mirror 50 at the end of the light conductor 40 is not always necessary; where it is absent, the light propagating through the light conductor 40 will be discharged also from the end of the light conductor 40. It should be noted that to set up an even distribution of light over the entire length of the light conductor 40 under the presence of the mirror 50, the pitch of the grooves or the spacing between the rings has to be calibrated taking into account the component of light which is reflected by the mirror 50 into the light conductor 40.

Figure 7:
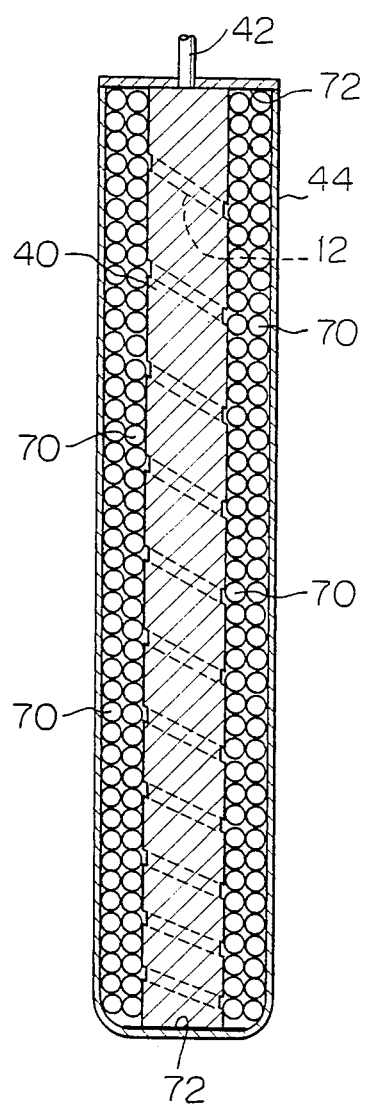
FIG. 7 is a view of another embodiment of the present invention.

Referring to FIG. 7, another embodiment of the photoradiator in accordance with the present invention is shown. In FIG. 7, structural elements common or similar to those of the foregoing embodiments are designated by like reference numerals and description thereof will be omitted for simplicity. The photoradiator in accordance with this embodiment comprises a number of small transparent pieces 70 which are confined in the annular space defined between the light conductor 40 and the sheath 44. Each of the transparent pieces 70 may have a spherical shape. The mass of the transparent pieces 70 are retained in the sheath 44 by a closure member 72 in contact with the outer periphery of the light conductor 40 and the inner periphery of the sheath 44.

In the construction shown in FIG. 7, the light propagating through the light conductor 40 is effectively steered by the interengaged portions of the transparent pieces 72 to the outside of the sheath 44.

While the light conductor 40 in FIG. 7 is shown to have spiral grooves 12, such is only illustrative. Where the light conductor 40 lacks the recessed configuration, the refractive index of the transparent pieces 70 may be selected to be larger than that of the light conductor 40. Concerning the non-recessed light conductor configuration, should the transparent pieces 70 have identical diameters, the quantity of light inside the light conductor 40 would sequentially decrease along the direction of light propagation resulting in uneven lighting. This may be overcome by sequentially reducing the diameter of the transparent pieces 70 along the direction of light propagation. Again, the reflector 50 at the end of the light conductor 40 does not constitute any essential part of the present invention, although desirable in the case where the photoradiator is applied to a chlorella cultivating apparatus or the like.

Referring to FIGS. 8A–8D, still another embodiment of the present invention is shown, in which the same reference numerals as those shown in FIGS. 4A to 7 designate the same structural elements. The light conductor 40 and the transparent or semitransparent sheath 44 define therebetween an annular spacing in which a plurality of transparent elongate members, or bars, 80 are disposed. Each of the bars 80 is positioned parallel to and in contact with the light conductor 40 and provided with a generally triangular cross-section. One side of the triangle is formed arcuate to remain in intimate contact with the outer periphery of the light conductor 40. The top of the sheath 44 is closed by a top plate 82, and the bottom by a bottom plate 84. The top plate 82 carries a mirror 86 therewith and the bottom plate, a mirror 88.

In the photoradiator described above, light introduced from the light conducting cable 42 into the light conductor 40 is routed through the bars 80 radially outwardly to illuminate the ambience.

It will be noted in FIGS. 8A–8D that the mirror 88 carried by the bottom plate 84 may be omitted to allow that part of the light which reaches the end of the light conductor 40 to emanate to the outside thereat.

Figure 8A:
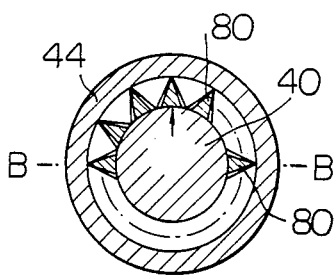
FIGS. 8A-8D are views of another embodiment of the present invention.
Figure 8C:
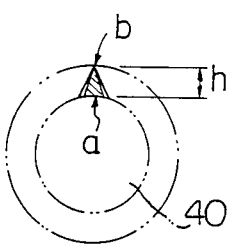

As shown in FIG. 8C, each of the bars 80 has a generally triangular cross-section which includes an arcuate side a engageable with the light conductor 40 and an apex or ridge b. The side a has a length l (FIG. 8D) which progressively increases along the direction of light propagation through the light conductor 40, that is, the bar 80 engages with the light conductor 40 over an area which progressively increases along the direction of light propagation. In other words, although the luminous flux density in the light conductor 40 sequentially decreases along the direction of light propagation, it is compensated for by the sequentially increasing contact area of the bar 80 with the light conductor 40. This allows the light to be discharged in a substantially even intensity distribution from the apex or ridge b of the bar 80.

Figure 9A:
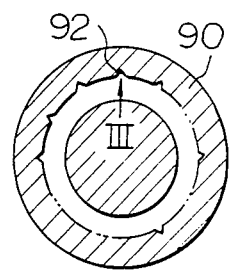
FIGS. 9A and 9B are views of a modification to a sheath included in the embodiment of FIGS. 8A-8D.
Figure 8B:
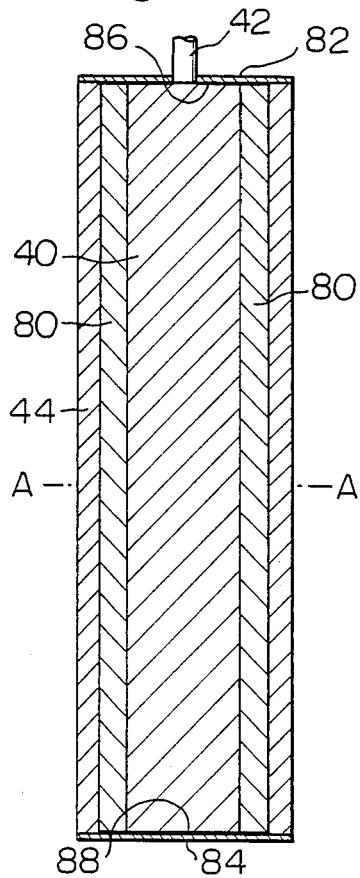
Figure 8D:
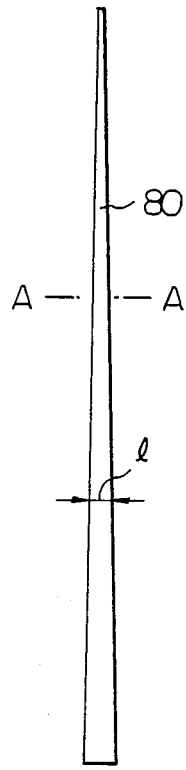
Figure 9B:
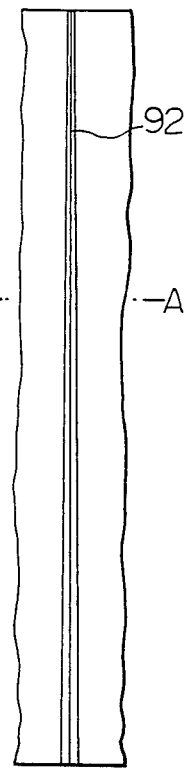

A modification to the sheath 80 of the photoradiator shown in FIGS. 8A–8D is shown in FIGS. 9A and 9B. The modified sheath 90 is formed with channels 92 in the inner periphery thereof in order to receive the ridges b of the bars 80. Assuming that the bars 80 have a common height h (FIG. 8C) as measured from their arcuate sides a, arranging the bars 80 around the light conductor 40 and then coupling the sheath 90 over the bars 80 will automatically position the bars 80 with accuracy relative to the light conductor 40. Positioned in this manner, the bars 80 may be bonded to the light conductor 40. Thus, the modified sheath configuration shown in FIGS. 9A and 9B facilitates positioning of the bars 80.

In summary, it will be seen that the present invention provides a simple photoradiator which is capable of effectively diffusing light in an even intensity distribution from a light conducting cable.

Various modifications will become possible for those skilled in the art after receiving the teachings of the present disclosure without departing from the scope thereof.

What is claimed is:

1. A photoradiator for diffusing light introduced from a light source comprising, in combination:
   a cylindrical light conducting member having one end and an other end, said light being introduced into said one end and propagating through the light conducting member in a direction toward said other end;
   a casing coaxially and hermetically surrounding said light conducting member to define an annular space in cooperation with the light conducting member, said casing being made of a light transmitting material; and
   a plurality of transparent members arranged in said annular space to engage with the outer periphery of the light conducting member and the inner periphery of the casing;
   said transparent members comprising transparent bars each having a substantially triangular cross-section, one side of said triangular cross-section being formed arcuate and engaged with the outer periphery of the light conducting member, said arcuate side having a length which progressively increases along the direction of light propagation through the light conducting member, said bars having a ridge formed at the junction of two of the side walls of said triangular cross-section;
   said casing being formed with channels in the inner periphery thereof for receiving said ridges of the bars;
   whereby the light propagating through the photoradiator is discharged radially outwardly from the photoradiator through the transparent members and the casing.

2. A photoradiator for diffusing light introduced from a light source comprising, in combination:
   a cylindrical light conducting member having one end and an other end, said light being introduced into said one end and propagating through the light conducting member;
   a casing coaxially and hermetically surrounding said light conducting member to define an annular space in cooperation with the light conducting member, said casing being made of a light transmitting material; and
   a plurality of elongated transparent rods disposed in said annular space and extending parallel to the light conducting member, said rods being in contact with one another and being in contact with the outer periphery of the light conducting member and the inner periphery of the casing, and a plurality of transparent rings in said annular space, surrounding said transparent rods, said rings being engaged with the rods at an inner periphery of said rings, the casing being engaged with the outer periphery of each of the rings at the inner periphery of said casing;

whereby the light propagating through the photoradiator is discharged radially outwardly from the photoradiator through the transparent members and the casing with the light emanating in the form of spots with the number of spots being the number of times said transparent rods engage the inner periphery of the rings.

3. A photoradiator as claimed in claim 2, in which said rings have a circular cross-sectional configuration.

4. A photoradiator according to claim 2, wherein said transparent members have a refractive index which increases in a direction from the outer periphery of the light conducting member to the inner periphery of the casing.

5. A photoradiator as claimed in claim 2, wherein said rings are spaced from one another by distances which sequentially decrease from said one end toward the other end of the light conducting member.

6. A photoradiator as claimed in claim 2, wherein said rings are disposed in said annular space such that adjacent rings contact one another.

7. A photoradiator for diffusing light introduced from a light source comprising, in combination:
   a cylindrical light conducting member having one end and an other end, said light being introduced into said one end and propagating through the light conducting member in a direction toward said other end;
   a casing coaxially and hermetically surrounding said light conducting member to define an annular space in cooperation with the light conducting member, said casing being made of a light transmitting material; and
   a pluraliry of transparent members arranged in said annular space and extending parallel to the light conducting member, said transparent members comprising transparent triangular bars each having a substantially triangular cross-section, said triangular bars having three apexes with one apex being in contact with the inner periphery of said casing, one side of said triangular cross-section opposite said one apex being formed arcuate and engaged with the outer periphery of the light conducting member, said arcuate side having a length which progressively increases along the direction of light propagation through the light conducting member;
   whereby the light propagating through the photoradiator is discharged radially outwardly from the photoradiator through the transparent members and the casing with the light being discharged from said one apexes in a substantially even intensity along the longitudinal length of said casing.

8. A photoradiator as claimed in claim 7, in which the height of said transparent members, considered along a radial line, is constant along the longitudinal length of said transparent members.

9. A photoradiator as claimed in claim 7, in which said transparent members have two converging sides extending from the ends of said one side, said two sides converging to join one another at a longitudinal extending ridge to define said one apex, and a plurality of longitudinally spaced channels in the inner periphery of said casing for receiving said ridges.

* * * * *